(12) United States Patent
Sánchez Castillo et al.

(10) Patent No.: US 12,554,166 B2
(45) Date of Patent: Feb. 17, 2026

(54) DISPLAY DEVICE, IN PARTICULAR FOR A VEHICLE, WITH SWITCHABLE SHARING AND PRIVATE MODES

(71) Applicant: BHTC GmbH, Lippstadt (DE)

(72) Inventors: Alberto Sánchez Castillo, Lippstadt (DE); Willem Hofman, Lippstadt (DE)

(73) Assignee: BHTC GmbH, Lippstadt (DE)

( * ) Notice: Subject to any disclaimer, the term of this patent is extended or adjusted under 35 U.S.C. 154(b) by 0 days.

(21) Appl. No.: 18/697,623

(22) PCT Filed: Oct. 6, 2022

(86) PCT No.: PCT/EP2022/077785
§ 371 (c)(1),
(2) Date: Apr. 1, 2024

(87) PCT Pub. No.: WO2023/057553
PCT Pub. Date: Apr. 13, 2023

(65) Prior Publication Data
US 2024/0402543 A1 Dec. 5, 2024

(30) Foreign Application Priority Data

Oct. 7, 2021 (DE) .................... 10 2021 126 024.8
Jun. 3, 2022 (DE) .................... 10 2022 114 155.1

(51) Int. Cl.
*G02F 1/1343* (2006.01)

(52) U.S. Cl.
CPC .. *G02F 1/134309* (2013.01); *G02F 2201/124* (2013.01)

(58) Field of Classification Search
None
See application file for complete search history.

(56) References Cited

U.S. PATENT DOCUMENTS

| | | | |
|---|---|---|---|
| 2010/0128189 A1 | 5/2010 | Teranishi et al. | |
| 2013/0229587 A1* | 9/2013 | Takama | G02F 1/137 349/138 |
| 2013/0265514 A1* | 10/2013 | Li | G02F 1/13624 349/41 |
| 2014/0118671 A1* | 5/2014 | Aoyama | G02F 1/134363 349/138 |
| 2016/0291337 A1* | 10/2016 | Ochiai | G02B 30/27 |
| 2017/0219836 A1* | 8/2017 | Hyodo | H04N 13/31 |
| 2018/0088366 A1 | 3/2018 | Xu | |
| 2018/0205942 A1* | 7/2018 | Smith | G09G 3/003 |
| 2019/0182476 A1* | 6/2019 | Kikuchi | H04N 13/398 |
| 2020/0073157 A1* | 3/2020 | Hirosawa | G02F 1/13624 |

OTHER PUBLICATIONS

International Search Report for corresponding Patent Application No. PCT/EP2022/077785 dated Feb. 10, 2023.

* cited by examiner

*Primary Examiner* — Ryan Crockett
(74) *Attorney, Agent, or Firm* — Christensen, Fonder, Dardi; Diane E. Bennett; Peter S. Dardi

(57) ABSTRACT

The display device comprises an LCD display having a plurality of pixels and a special split electrode design, which makes it possible, using IPS technology, to influence the intensity and homogeneity of the electrical field propagating within a pixel. As a result, each pixel can switch from a sharing mode with maximum luminescence and a symmetrical viewing angle range into a private mode with reduced luminescence and an asymmetrical viewing angle range and back again, and vice versa into the sharing mode.

1 Claim, 7 Drawing Sheets

Figure 1:
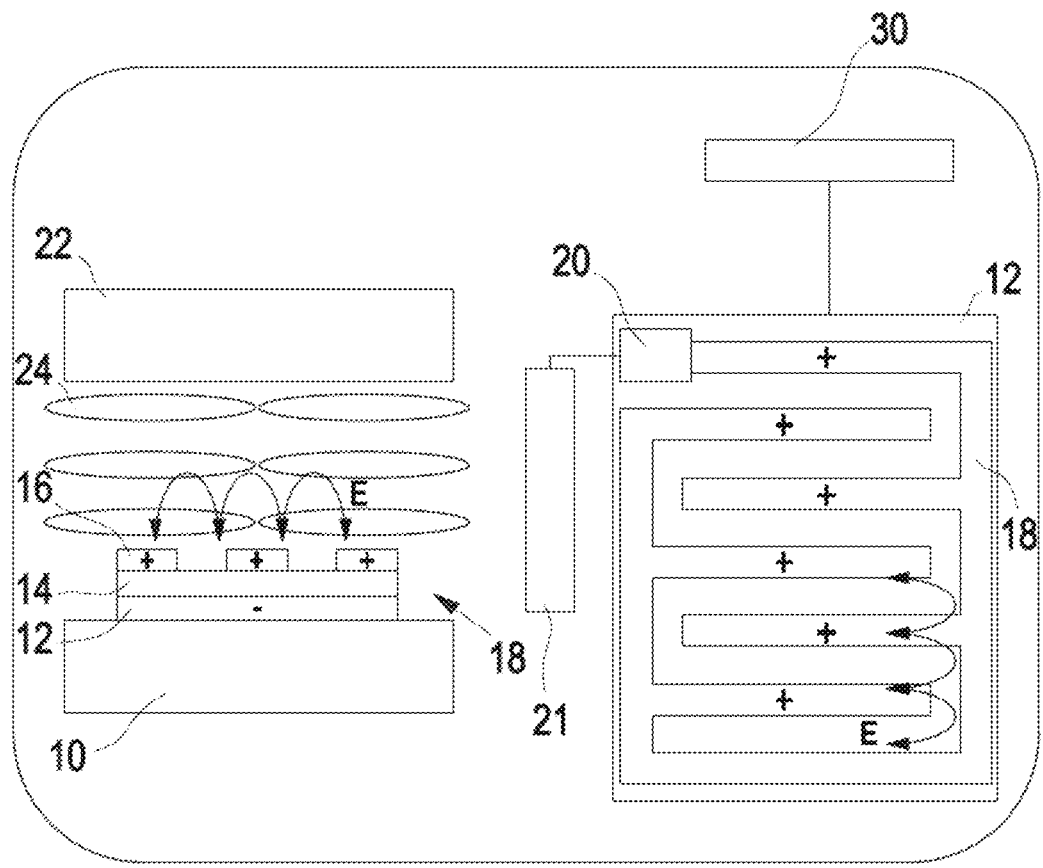

DISPLAY DEVICE, IN PARTICULAR FOR A VEHICLE, WITH SWITCHABLE SHARING AND PRIVATE MODES

CROSS REFERENCE TO RELATED APPLICATIONS

This application is a National Stage filing of PCT Application No. PCT/EP2022/077785 filed Oct. 6, 2022, entitled "Display Device, in Particular for a Vehicle, with Switchable Sharing and Private Modes", which claims the priorities of the national German patent applications 10 2021 126 024.8 of 7 Oct. 2021 and 10 2022 114 155.1 of 3 Jun. 2022, the content of which hereby belongs to the subject matter of the present application by reference.

The invention relates to a display device, in particular for use in a vehicle which can be operated either in sharing mode or private mode.

The number and size of displays in vehicles in particular is continually increasing. For instance, nowadays there are already vehicle concepts in which there are also displays for the passenger in or on the dashboard, and specifically either in the form of displays separate from other displays or in the form of the passenger part of a door-to-door display.

For quite a while already, there have been measures for limiting a third party's ability to freely view information displayed on a display surface. Ideally, only the intended viewer should be able to perceive the content on the screen, while persons in the vicinity should not be able to read/comprehend or perceive the displayed information.

US-A-2020/0073157 and US-A-2013/0265514 describe two examples of LCD displays having a controllable viewing angle range.

LCD displays which have in-plane switching (IPS) technology have proven particularly effective.

The problem addressed by the invention is to provide a display device, in particular for a vehicle, which provides an electronic option for selective operation in sharing mode or in private mode and has IPS technology.

To solve this problem, the invention proposes a display device, in particular for a vehicle, which, according to a first variant of the invention, is provided with an LCD display having a plurality of pixels which comprises a transparent carrier layer, on which, per pixel, a group of electrodes and also electronic components for actuating the electrodes are arranged, a transparent cover layer forming a display surface, and a liquid crystals layer between the carrier layer and the cover layer, wherein each group of electrodes comprises a ground electrode surface that can be connected to a ground potential and at least two electrode combs which can be connected to an operating potential independently of one another and each of which comprises a first portion, from which a plurality of second portions extend, wherein the two first portions of both electrode combs extend in parallel toward one another and the second portion of one electrode comb extends between adjacent second portions of the other electrode comb, wherein the two electrodes are arranged to be electrically insulated from one another and from the ground electrode surface and are arranged thereabove, and an actuation unit, which comprises the electronic components, inter alia, for connecting one of the two electrode combs of each pixel or selected pixels to the operating potential in a private mode and for connecting both electrode combs of each pixel or selected pixels to the operating potential in a sharing mode, as a result of which information displayed on the display surface of the LCD display, when looking at the display surface from a viewing direction facing the first portion of one of the two electrode combs of all the pixels, is visible in greater contrast in sharing mode than in private mode, in which only the electrode comb of each pixel or selected pixels of which the first portion(s) face(s) away from said viewing direction is connected to the ground potential, i.e. that electrode comb of each pixel or selected pixels of which the first portion(s) face(s) said viewing direction is not connected to the ground potential.

According to a second variant of the invention, to solve the above problem, a display device, in particular for a vehicle, is proposed, which is provided with an LCD display having a plurality of pixels which comprises a transparent carrier layer, on which, per pixel, a group of electrodes and also electronic components for actuating the electrodes are arranged, a transparent cover layer forming a display surface, and a liquid crystals layer between the carrier layer and the cover layer, wherein each group of electrodes comprises a first electrode surface that can be connected to a ground potential and two second electrode surfaces that can be connected to the ground potential, are electrically insulated from one another and from the first electrode surface, and are arranged above or below the first electrode surface such that they are together flush therewith, wherein each group of electrodes comprises a third electrode, which is arranged to be electrically insulated from the first and second electrode surfaces and can be connected to an operating potential, and an actuation unit, which comprises the electronic components, inter alia, for connecting, in sharing mode, the third electrode of each pixel or selected pixels to the operating potential and for connecting the first electrode surfaces of each pixel or selected pixels to the ground potential and for connecting, in private mode, the first electrode surface and additionally one of the two second electrode surfaces of each pixel or selected pixels to the ground potential, as a result of which information displayed on the display surface of the LCD display, when looking at the display surface from a viewing direction facing one of the two second electrode surfaces of all the pixels, is visible in greater contrast in sharing mode than in private mode, in which the one of the two second electrode surfaces of each pixel or selected pixels which faces away from said viewing direction is connected to the ground potential, i.e. the other of the two second electrode surfaces of each pixel or selected pixels which faces away from said viewing direction is not connected to the ground potential.

According to the invention, the display devices according to both variants comprise an LCD display having IPS technology. In this case, however, in the first variant the positive electrode is constructed in multiple parts, while in the second variant of the display device according to the invention, per pixel, the negative electrode is constructed in multiple parts. By selectively differently actuating the individual electrodes of one electrode, constructed in multiple parts in each case, of each pixel of the LCD display in IPS technology, the contrast can be influenced, and specifically when viewing the display surface from the viewing direction that faces the electrode that is not actuated.

According to the first variant of the display device according to the invention, its pixels each comprise a ground electrode and a plurality of positive electrodes that can be actuated according to the information to be displayed. The positive electrodes are beside one another and are electrically insulated from one another as well as electrically insulated from the ground electrode. If both positive electrodes are actuated by the signal provided for displaying the desired information, which is carried out by transistors typically configured with TFT technology, the intensity of the electrical field propagating in the liquid crystal layer is at a maximum. This results in maximum contrast and maximum light transmission. If, however, just one of the positive electrodes is actuated per pixel or selected pixel, the intensity of the electrical field drops and so does the contrast and the transmittance for the backlighting, which primarily has an effect when the display is viewed from the viewing direction that does not face the non-actuated positive electrode.

Optimal effects are achieved when each two positive electrodes have a comb structure, with the "prongs" of each comb alternately engaging in one another. Each electrode comb therefore comprises a first portion, with these first portions of the two electrode combs extending in parallel with one another. Second portions extend from each of these first portions, with a second portion of the other electrode comb extending between two adjacent second portions of the one electrode comb. In principle, this electrode design is equivalent to that of LCD pixels in IPS technology, but has the crucial difference from the known prior art whereby the known electrode design is split into two sub-electrodes, which can be actuated separately (typically by TFT transistors).

In the second variant of the display device concept according to the invention, the electrode design known from LCD displays in IPS technology is used as the positive electrode, which comprises two comb structures, with the first portions of both comb structures being electrically interconnected and the second portions, which each protrude from the first portions, alternately following one another, i.e. being alternately beside one another. The negative electrode is then constructed in multiple parts. It comprises a negative electrode surface, which substantially fills the surface of the pixel. There is another split negative electrode surface having two or more negative electrode surfaces, which are arranged beside one another and are electrically insulated from one another, above or below this first negative electrode surface so as to be electrically insulated. The electrical field that forms within a pixel in the liquid crystal layer can then be influenced by the selection of the actuated negative electrode surface or negative electrode sub-surfaces, and specifically both with respect to its intensity or strength and with respect to its homogeneity when viewed across the surface of the pixel. If, specifically, just one of the two negative electrode sub-surfaces is actuated, this results in an asymmetry in the electrical field in that its strength in the region of the non-actuated negative electrode sub-surface is lower than in the remaining region of the pixel. This has an effect both on the light transmission and on the contrast, and specifically when viewing the display surface from the viewing direction which faces the non-actuated second negative electrode sub-surface.

Figure 2:
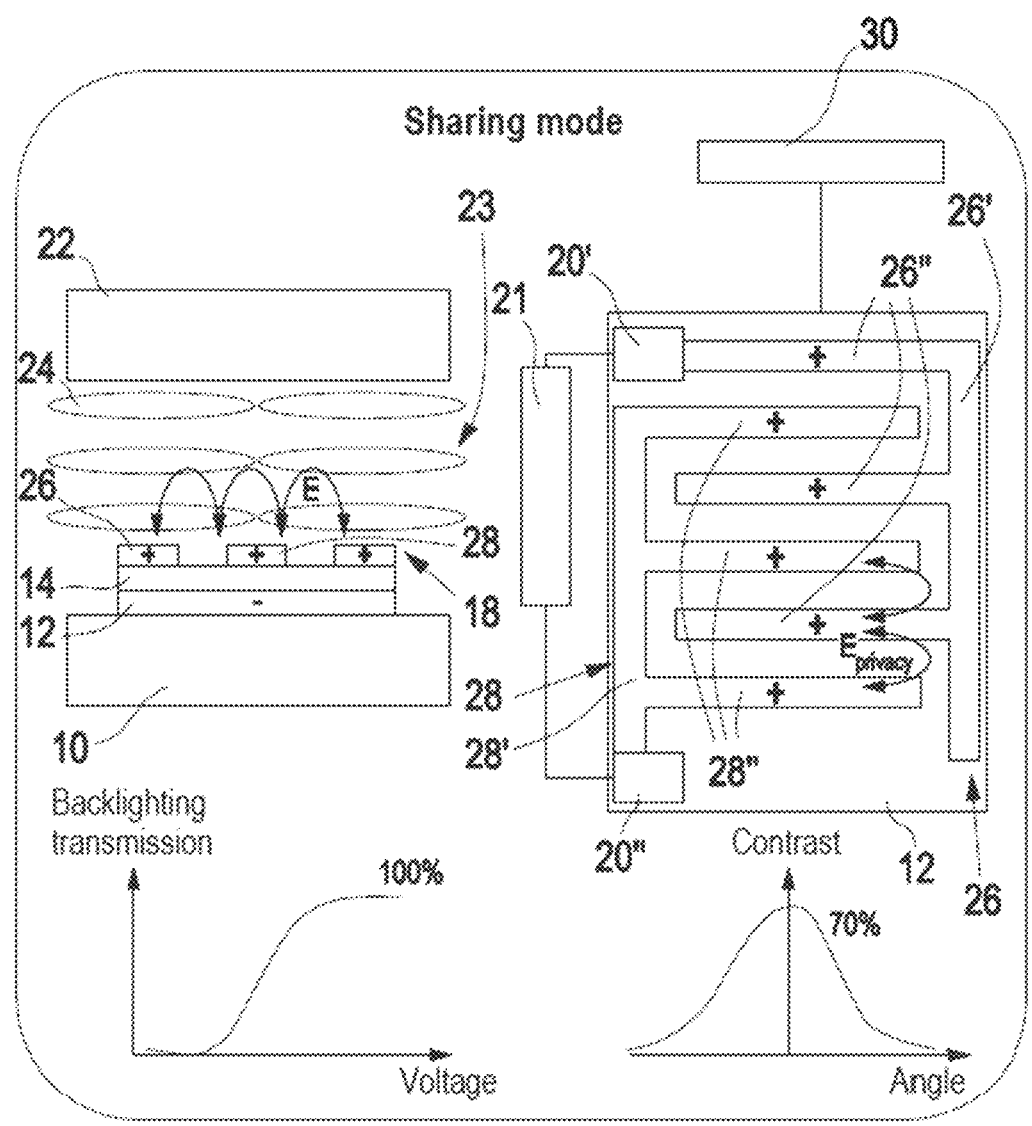
Figure 3:
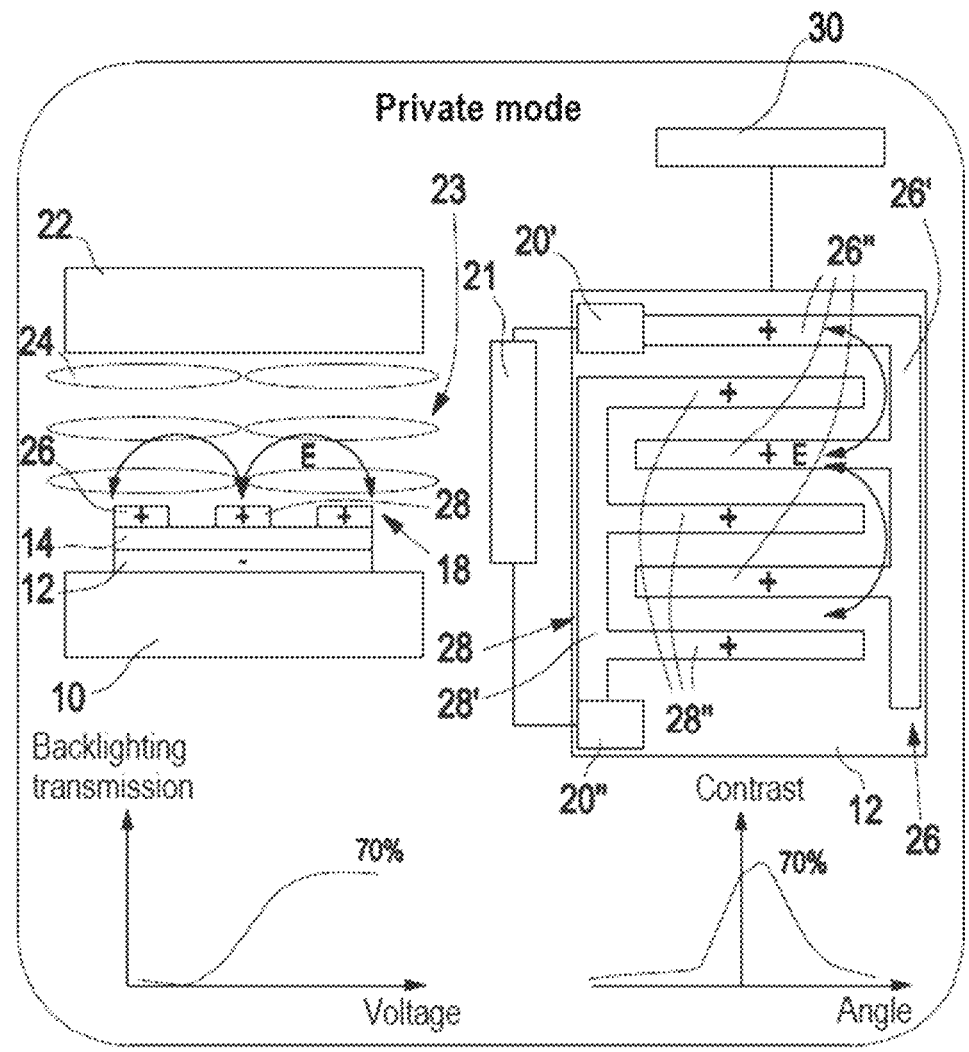
Figure 4:
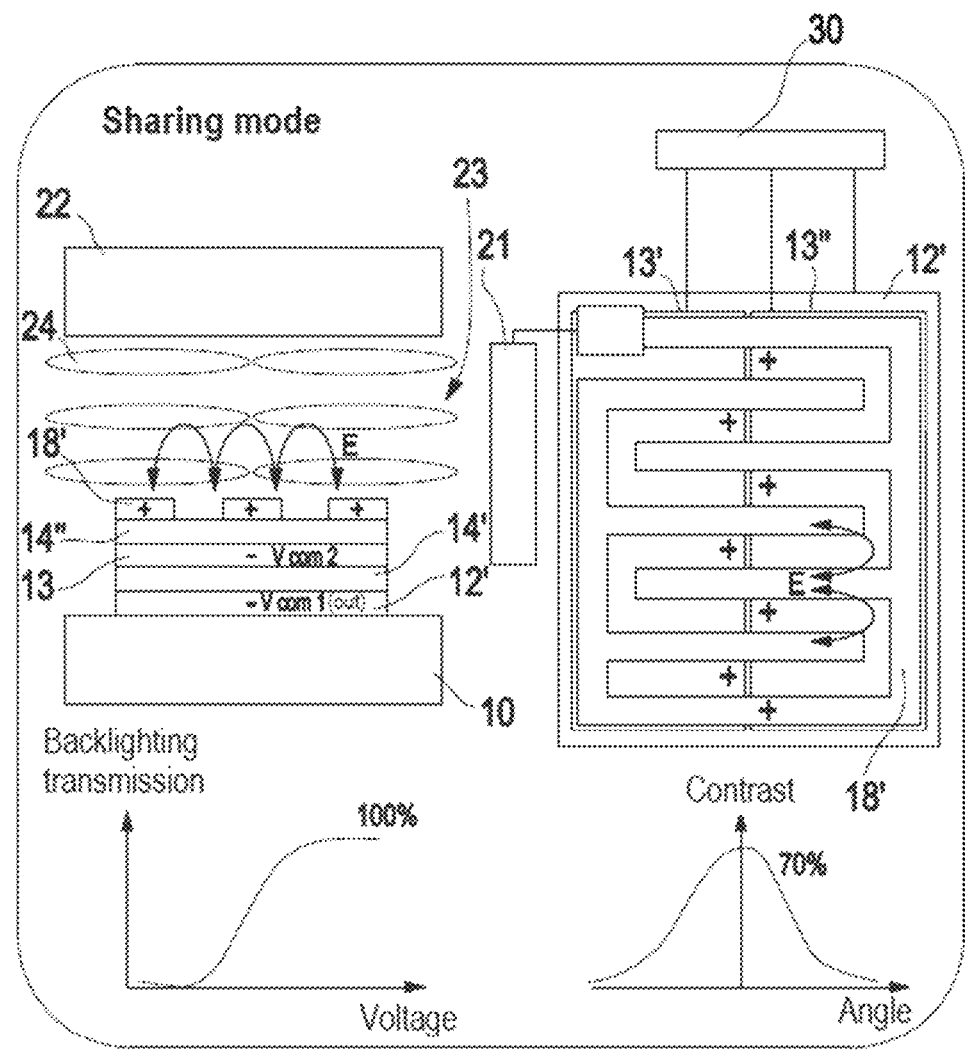
Figure 5:
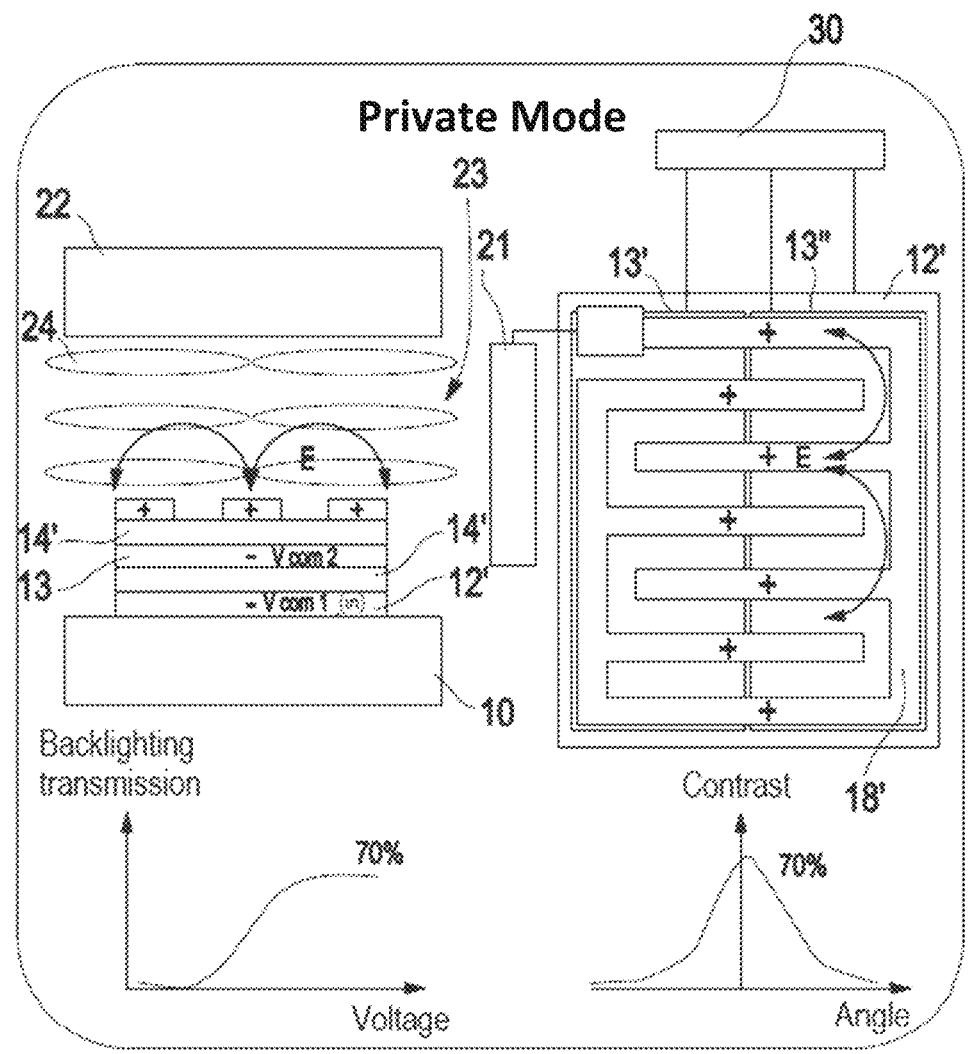
Figure 6:
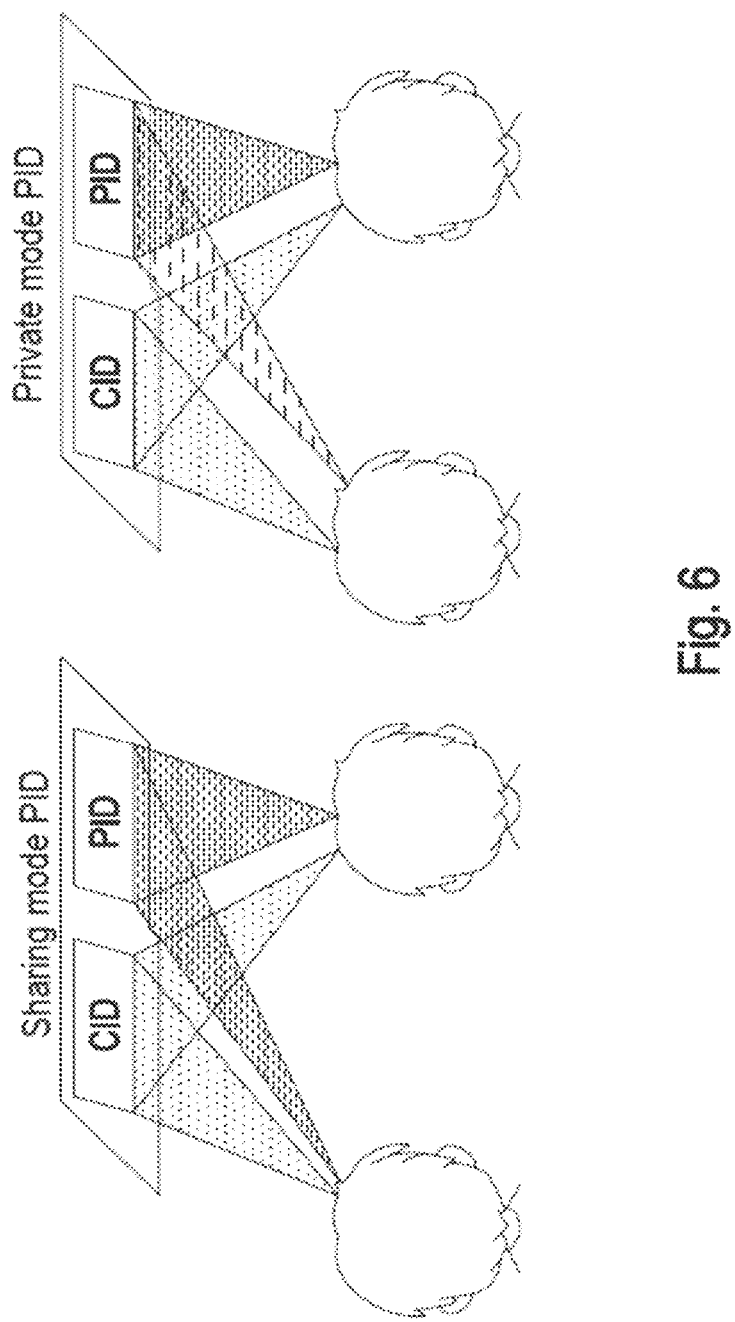
Figure 7:
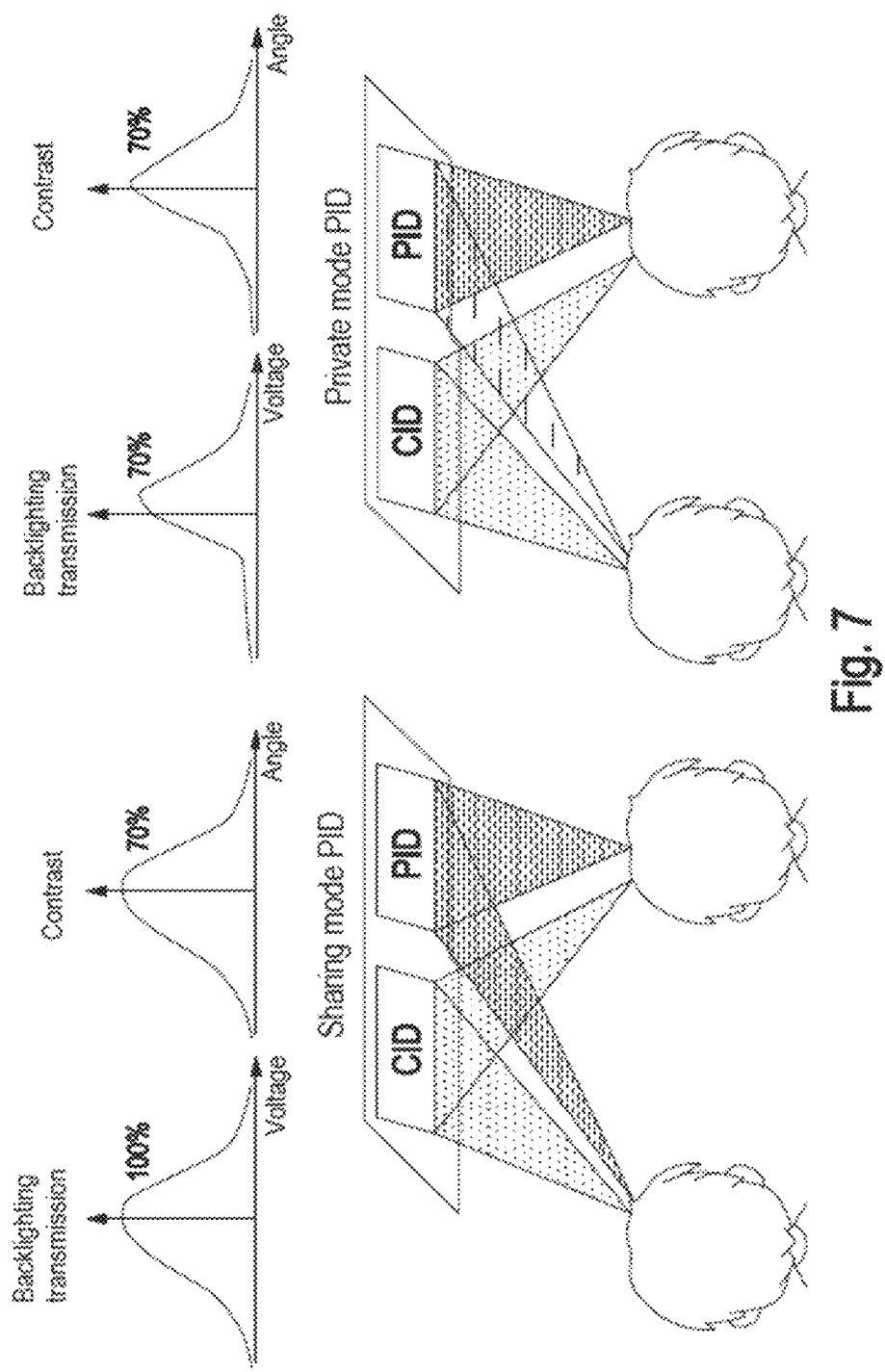

The invention is explained in greater detail in the following on the basis of two exemplary embodiments with reference to the drawings, in which, in detail:

FIG. 1 shows schematic cross-sectional and plan views of the standard design of an LCD pixel in IPS technology, FIG. 2 shows cross-sectional and plan views of a modification to the pixel design according to a first exemplary embodiment during actuation for sharing mode, FIG. 3 shows schematic cross-sectional and plan views of the pixel design according to the first exemplary embodiment, but during actuation for private mode, FIG. 4 shows cross-sectional and plan views of a modification to the pixel design according to a second exemplary embodiment during actuation for sharing mode, FIG. 5 shows schematic cross-sectional and plan views of the pixel design according to the second exemplary embodiment, but during actuation for private mode, FIG. 6 shows a comparison of the visibility conditions for the driver and the passenger in the operating modes of the display assigned to the passenger in sharing mode (on the left in FIG. 6) and in private mode (on the right in FIG. 6), and FIG. 7 shows a comparison of the visibility conditions for the driver and the passenger in the operating modes of the display assigned to the passenger in sharing mode (on the left in FIG. 7) and in private mode (on the right in FIG. 7) with additional reduction of the backlighting intensity of the display assigned to the passenger in private mode operation.

Privacy protection technologies for limiting/preventing a third party's ability to read content displayed on a display have been on the market for many years so as to allow the display to be visible only in a preferred direction, while the information is not visible in any other direction. The known technologies are based on both static privacy protection and switchable privacy protection. The static option brings about the privacy protection effect by implementing light control systems (i.e. light control film, prisms, etc.) in the backlighting unit of the display. For switchable privacy protection, the design of the backlighting has been expanded such that both the actuation of illumination with normal light and privacy protection illumination is facilitated. These approaches reduce the luminance over the viewing angle, but, in dark conditions, the visibility of the image cannot be reduced to a low light intensity owing to the daylight recalibration of the human eye. In this case, the image is still visible even if the luminance is only 0.3 cd/m$^2$, which results in a reduced level of privacy protection performance.

When using these types of privacy protection concepts in a vehicle, information on a separate display or display region, assigned to the passenger, of a door-to-door display, for example, still remains at least faintly perceptible to the driver, which could distract them and thus lead to hazardous situations developing. The option of switching to an improved private mode is therefore significant in terms of safety in particular in motor vehicle applications.

By contrast, in other approaches the focus is primarily only on the privacy protection on display panels, by the pixel design being converted into different electrical actuation modes. In this type of approach, an in-cell display cannot be implemented. In these approaches, the luminance or contrast ratio is reduced, but the reduction in the visibility of the image is only obtained when a very heavy dimming factor is used in the backlighting, which has a drastic effect on the image quality for the intended user.

These approaches that are on the market are primarily suitable for an application on the end consumer market and are very effective for generating the privacy protection effect under normal light conditions. If, however, the ambient light is relatively low, as is the case when driving a vehicle at night, the privacy protection is not as effective, since the eye readjusts to low light intensities.

These approaches have drawbacks in relation to optical performance because the switchable performance optimized for private mode drastically reduces the performance of the display in normal sharing operation. This is also a drawback in the vehicle. Owing to the number of displays integrated in the dashboard of the vehicle, they have to be coordinated with one another such that they provide similar optical performance. Privacy protection technology that is not capable of producing optical performance in sharing mode that is similar to the rest of the displays in the vehicle is potentially not suitable for applications in motor vehicles.

The invention presents a solution for obtaining the added value of a display in the automotive sector combined with an improved privacy protection display effect in applications with discrete and in-cell touch technologies. In this case, the display performance and in-cell compatibility of the design are guaranteed by the pixel design according to the invention on the basis of an IPS-like pixel design. The dual-mode pixel design proposed according to the invention in particular has the following advantages in relation to the application in a vehicle:

The pixel is IPS-like in sharing mode (normal or first pixel actuation mode). This can achieve the high optical performance required in the automotive sector.

The pixel actuation can be switched into private mode (second pixel actuation mode) in order to selectively reduce the contrast in the direction of the driver position and simultaneously maintain the luminance and the contrast level in the passenger position.

A display according to an exemplary embodiment of the invention uses in-plane switching (IPS) technology and comprises, inter alia, the following elements:

LCD TFT glass
LCD color filter glass
Liquid crystal
Orientation layer
Electronic actuation (IC actuation, routing, TFT, gate-on-panel)

Other components such as a touch panel and a backlighting unit as well as, where required, a proximity sensor system integrated in the display device and possibly having gesture recognition can also be provided, but essentially do not play any role in conjunction with the invention. The polarization filters that are typically provided are not discussed any further in the following, since they are not of any significance for the invention.

The color filter glass and the IC actuation are of a conventional type and can be selected according to the functionalities and performance that are supposed to be achieved by the display. The color scale can be set by a color filter, for example. Furthermore, an in-cell IC actuation type and/or a separate touch panel can be implemented.

IPS displays are characterized, inter alia, by wide viewing angles and optimal color representation with very high image quality. The standard pixel design of the IPS type comprises a thin film transistor (TFT). The video signal (voltage level) is applied to the electrode of the pixel in order to generate a voltage level on the pixel. The voltage difference between mass (Vcom) and the voltage level on the grid thus defines the total voltage level (electrical field) in the liquid crystal in order to generate a defined and well-controlled grayscale.

FIG. 1 shows this situation. In this figure, the electrode design can be in the form of a multi-domain electrode (V-shaped, two domains, zig zag, etc.), i.e. having a plurality of electrode surfaces per pixel, the geometry and number of which can be different depending on the design, in order to obtain symmetrical properties in relation to the transformation ratio and contrast ratio, and also in order to achieve a low color shift level.

The standard pixel design in FIG. 1 in IPS technology conventionally comprises a TFT panel 10, on which, per pixel, a ground electrode or ground electrode surface 12 is arranged (connected to ground via the actuation unit 30). The "fingers" 16 of a single electrode 18, which is actuated by a TFT transistor 20 (see the actuation unit 21), are located through an electrically insulating insulation layer 14 separately from the ground electrode surface 12. The cover glass 22 of the LCD display is located above the TFT panel 10 at a distance therefrom, the liquid crystals layer 24 being located between the TFT panel 10 and the cover glass 22.

According to a first variant of the invention (see FIGS. 2 and 3), the electrode design is split into two (sub-) electrodes in comparison with a single-electrode pixel design. A separate TFT transistor 20', 20" is connected to each sub-electrode (in this exemplary embodiment, configured as electrode combs 26, 28). When the display is operated in sharing mode, the two TFTs are selected when the pixel is to be actuated. Here, the standard electrical field is generated for the standard design of the IPS type (see FIG. 2).

If, in private mode, one of the two TFT transistors 20', 20" is switched off by the control unit, the electrical field changes (FIG. 3). Here, a single liquid crystal domain direction is preferred, meaning that the optical properties become asymmetrical. Most of all, the luminance transmission of the pixel is reduced across the viewing angle, in the same way as the contrast ratio. Here, the electrode form of the pixel can be optimized to the extent that the minimum contrast is reached in the driver position. A contrast ratio (CR) representation of the expected asymmetry is shown in FIG. 3, and FIG. 2 shows the standard, symmetrical CR representation.

The pixel design and in particular the electrode design according to this first variant (first exemplary embodiment) differs from the standard IPS design in that the positive electrode to which the video signal or the signal responsible for the display of the information is applied by the actuation unit 21 is split into multiple parts. In this exemplary embodiment, said electrode 18 is split into two electrode combs 26, 28, which are electrically insulated from one another and can be selectively actuated by TFT transistors 20', 20". FIG. 2 shows the simultaneous actuation of both electrode combs 26, 28, by means of which the electrical field within the pixel is configured to be comparatively strong and uniform. In this type of pixel operation, this pixel is operated in sharing mode. The transmission and contrast profiles in FIG. 2 show 100% luminous transmittance and the comparatively wide symmetrical viewing angle range.

If the pixel is operated in private mode, just one of the two electrode combs 26, 28 is activated. The electrical field that forms in the liquid crystal region within the pixel is now weaker and also asymmetrical. As a result, the transmittance to be achieved and the viewing angle range, which is also shifted to one side, are reduced. In relation to the situation shown in FIG. 3, a viewer positioned to the left of the display would therefore have a severely limited viewing range of the display. By individually actuating the other electrode comb 26 (instead of the electrode comb 28, as shown in FIG. 3), the private mode is activated with respect to a viewer positioned to the right of the display. The direction of the protection function can therefore be influenced by selecting the actuation of one of the two electrode combs 26, 28.

In the second exemplary embodiment (FIGS. 4 and 5), the design consists of a single TFT 20 having a single-grid multi-domain electrode design (as in the IPS standard design). The Vcom electrode design (ground electrode or ground electrode surface) is, however, expanded by a second Vcom electrode surface. The second Vcom2 electrode is placed on the standard Vcom1, with an insulation layer being located between the two. Vcom2 can be a single domain or dual domain in order to integrate selective Vcom actuation in the asymmetrical direction. Vcom1 and Vcom2 can then be coordinated with one another such that they generate an overall electrical field that is similar to the IPS-like actuation for operation in sharing mode (FIG. 4) and introduces selective asymmetry in private mode (FIG. 5). This asymmetry in the electrical actuation results in asymmetry in the contrast and luminance performance across the viewing angle of the pixel. Here, the electrode form of the pixel can be optimized such that the minimum contrast is reached in the driver position.

FIG. 4 shows the alternative pixel design during operation in sharing mode. The ground electrode design comprises a first ground electrode surface 12', on which a second ground electrode surface 13 is arranged so as to be separated by an insulation layer 14', on which, in turn, the positive electrode 18', which has a comb structure and is not split, is arranged so as to likewise be separated by an insulation layer 14". This third electrode 18' is identical in design to the design of the positive electrode of the standard IPS pixel. In this exemplary embodiment, the second ground electrode surface 13 is split into two ground electrode surfaces 13', 13". By selectively actuating (see the further actuation unit 30) both or one of the two ground electrode sub-surfaces 13', 13" in addition to the first ground electrode surface 12 (with simultaneous actuation of the third electrode 18'), the electrical field for the liquid crystals within the pixel is influenced, specifically with respect to its strength and with respect to its homogeneity (symmetry, asymmetry), as described above, in order to be able to switch between sharing mode and private mode (see FIG. 5).

The asymmetry of the Vcom2 ground electrode surface of the pixel split by the ground electrode sub-surfaces 13', 13" results in a coordinated asymmetrical contrast ratio. The minimum contrast can be reached on the horizontal axis and coordinated with the driver position. In this case, IPS-like properties are achieved in sharing mode, while, in private mode, the asymmetrical reduced contrast reduces the visibility of the image from the position beside the display PID, e.g. from the driver position, for the viewer positioned in front of the display PID (e.g. the passenger), but this is entirely sufficient (see the comparison in FIG. 6 with the CID display between the driver and the passenger and the PID display in front of the passenger).

Both pixel designs are compatible with the standard TFT manufacturing process for displays in the automotive sector and are also compatible with the segmented Vcom design standardized for in-cell technology.

By combining the luminance profile of a backlighting unit that can likewise be switched between private mode and sharing mode (see e.g. the German patent application 10 2022 114 153.5 of 3 Jun. 2022 with the title "Display device, in particular for a vehicle, for displaying information, having switchable sharing and private modes", the content of which hereby also belongs to the subject matter of the present PCT application by reference) with the profile of the contrast and the viewing angle limitation on the pixel level, which profile can be switched between private mode and sharing mode according to the invention, the requirements placed on the level of privacy protection in the automotive sector can be met, which consist of the visibility of the image and the reduction in the level of distraction. This is shown by the comparison in FIG. 7.

In displays having a switchable privacy protection function for swapping between sharing mode and private mode, as provided according to the invention, this switching can take place both manually and automatically. In automotive applications, automatic switching from sharing mode into private mode makes sense if, for example, a camera observing the driver detects that the driver is looking toward the passenger display or passenger display region (eye tracking). However, it also makes sense to automatically switch to private mode if "moving images" are displayed on the passenger display or passenger display region. There are therefore various approaches for automatically switching from sharing mode into private mode. Accordingly, sharing mode is then also reinstated automatically. Automatic switching into private mode can be omitted in vehicles having seat occupancy recognition if it has not been detected that the passenger seat is occupied.

The concept according to the invention can also be combined with non-switchable privacy protection functions (permanent private mode). One example of a privacy protection concept is described in the PCT patent application with the title "Display device, in particular for a vehicle, for displaying information, with asymmetrical backlighting" (filed on the same date as the present PCT patent application) and in the German patent applications 10 2021 126 025.6 of 7 Oct. 2021 and 10 2022 144 165.9 of 3 Jun. 2022, the content of which hereby also belongs to the subject matter of the present PCT application by reference.

LIST OF REFERENCE SIGNS

10 TFT panel
12 Ground electrode surface
12 First ground electrode surface
13 Ground electrode surface
13' Ground electrode sub-surfaces
13" Ground electrode sub-surfaces
14 Electrically insulating insulation layer
14' Insulation layer
14" Insulation layer
18 Electrode
18' Third electrode
20 TFT transistor
20' TFT transistors
20" TFT transistors
21 Actuation unit for TFT
22 Cover glass
23 LCD display
24 Liquid crystals layer
26 Electrode comb
28 Electrode comb
30 Actuation unit (for Vcom1 and Vcom2)

The invention claimed is:
1. A display device, in particular for a vehicle, comprising an LCD display having a plurality of pixels which comprises a transparent carrier layer (10), on which, per pixel, a group of electrodes (12', 13', 13", 18') and also electronic components for actuating the electrodes (12', 13', 13", 18') are arranged, a transparent cover layer (22) forming a display surface, and a liquid crystals layer (24) between the carrier layer (10) and the cover layer (22), wherein each group of electrodes (12', 13', 13", 18') comprises a first electrode surface (12') that can be connected to a ground potential and a split electrode surface having two coplanar second electrode surfaces (13', 13") that can be connected to the ground potential, are electrically insulated from one another and from the first electrode surface (12'), and are arranged above or below the first electrode surface (12') such that side edges of the split electrode surface are flush with side edges of the first electrode surface in a side view, wherein each group of electrodes (12', 13', 13", 18') comprises a third electrode (18'), which is arranged to be electrically insulated from the first and second electrode surfaces (12', 13', 13") and can be connected to an operating potential, and an actuation unit, which comprises the electronic components, inter alia, for connecting the third electrode (18') of each pixel or selected pixels to the operating potential and for connecting the first electrode surfaces (12') of each pixel or selected pixels to the ground potential in a sharing mode and for connecting the first electrode surface (12') and additionally one of the two second electrode surfaces (13', 13") of each pixel or selected pixels to the ground potential in a private mode, as a result of which information displayed on the display surface of the LCD display, when looking at the display surface from a viewing direction facing one of the two second electrode surfaces (13', 13") of all the pixels, is visible in greater contrast in sharing mode than in private mode, in which the one of the two second electrode surfaces (13', 13") of each pixel or selected pixels which faces away from said viewing direction is connected to the ground potential.

* * * * *